United States Patent [19]

Senior et al.

[11] 4,135,774

[45] Jan. 23, 1979

[54] JOINTING MEMBERS AND JOINTS

[75] Inventors: Adrain Senior; Richard Gilman, both of Barnsby, England

[73] Assignee: Pioneer Works, Barnsby, England

[21] Appl. No.: 855,700

[22] Filed: Nov. 29, 1977

[51] Int. Cl.$^2$ ............................................. H01R 39/00
[52] U.S. Cl. .................................... 339/7; 174/99 E; 191/25; 191/44.1; 339/22 B; 339/255 L
[58] Field of Search ...................... 174/99 E; 191/44.1, 191/25, 31; 339/7, 22 B, 95 R, 255 R, 255 L

[56] References Cited

U.S. PATENT DOCUMENTS

| | | | |
|---|---|---|---|
| 2,933,567 | 4/1960 | Mageoch | 191/44.1 X |
| 3,077,512 | 2/1963 | Frostick | 174/99 E |
| 3,341,670 | 9/1967 | Martin et al. | 191/44.1 X |
| 3,605,064 | 9/1971 | Routh | 339/22 B X |
| 4,018,497 | 4/1977 | Bulanchuk | 191/44.1 X |
| 4,067,257 | 1/1978 | Pentith | 191/25 X |

Primary Examiner—Roy Lake
Assistant Examiner—DeWalden W. Jones
Attorney, Agent, or Firm—Lowe, King, Price & Becker

[57] ABSTRACT

An electrical joint which is capable, while carrying current, of simultaneous vertical and horizontal articulation as well as extension or retraction in the longitudinal direction comprises in combination a pair of electrical conductors for supplying electrical energy to mine equipment, each of said conductors having a square C cross section defined by a rear wall, a pair of upstanding ends formed, respectively, on opposite edges of said rear wall, and a pair of inturned lips formed, respectively, on said upstanding ends; a unitary jointing member having an I cross-section defined by first and second parallel cheeks interconnected by a central stem portion; said jointing member being mutully engaged with said conductors with said first cheek being located within said conductors, with said first cheek having a dimension, in its direction of parallelism, such that there is established an articulation space beyond opposite ends of said first cheek, and with said stem portion extending outwardly between the inturned lips of said conductors; and at least one resilient, electrically conductive member interposed between said jointing member and the rear walls of said conductors; the length of the stem portion of said jointing member being greater than the thickness of the lips to establish a further articulation space between the inturned lips of said conductors and the second cheek of said jointing member.

8 Claims, 6 Drawing Figures

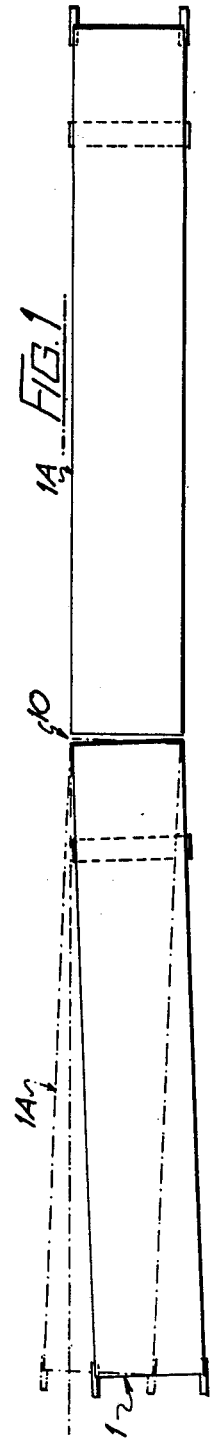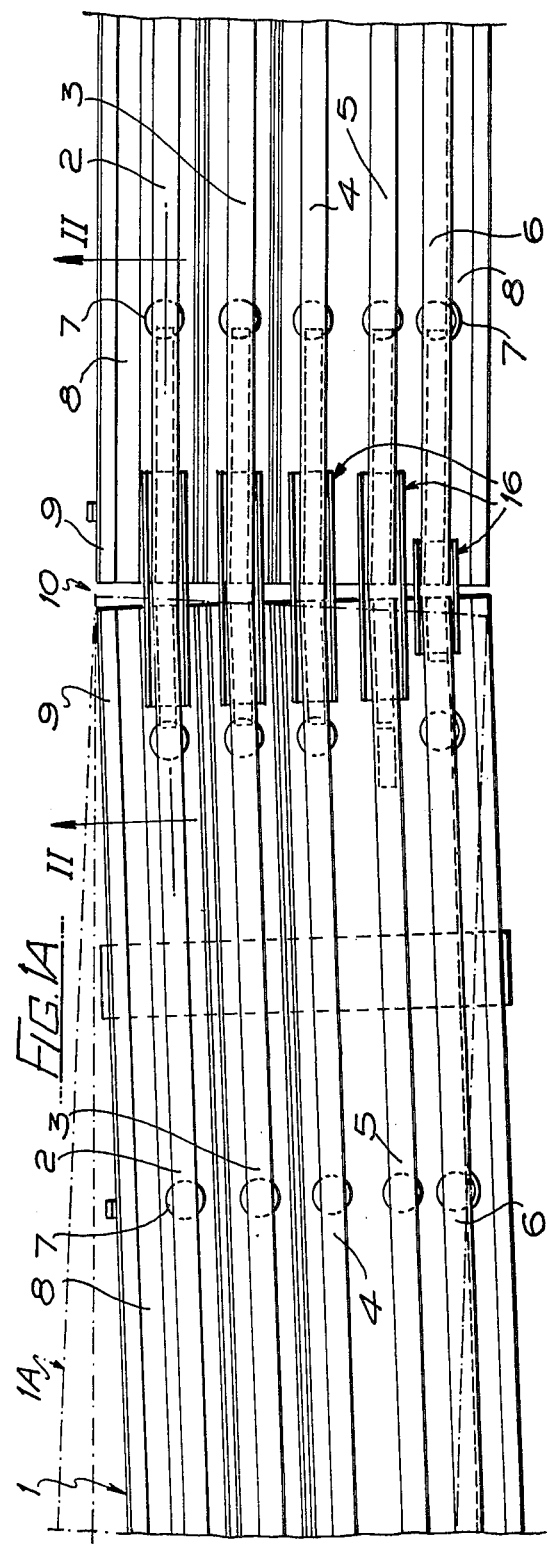

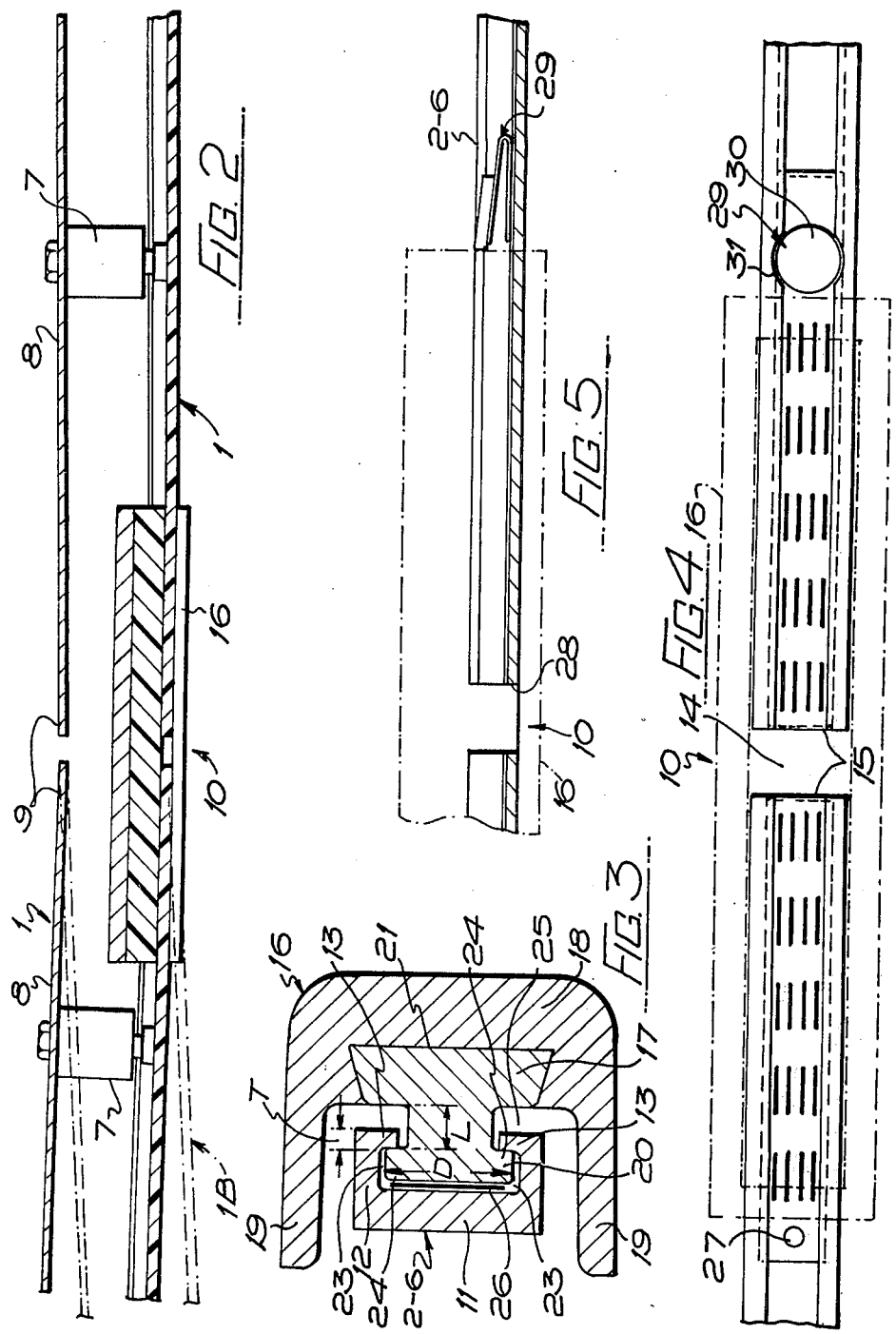

JOINTING MEMBERS AND JOINTS

This invention relates to joints for electrical conductors, such joints being made up of a jointing member and a pair of electrical conductors.

Many types of electrical jointing members and joints are in service, but in certain circumstances vertical and/or horizontal articulation at the joint is required, whilst simultaneously providing the necessary electrical continuity. One such use is in the mining equipment described in allowed U.S. Pat. application Ser. No. 574,948, where there is described a conveyor pan to be assembled in use to form an armoured scraper chain conveyor to extend along a mineral face, with the pan provided with an electrical conductor located in a longitudinally extending conduit. Adjacent pans are connected, as are adjacent conductors, and in use a mining machine travels along the conveyor and picks up electrical energy to power one or more electrical motors of the machine from the conductor. In conventional mining practice, the individual pans which make up the conveyors are "snaked" forwards, after the passage of the mining machine in a mineral cutting run, towards the newly exposed mineral face, and hence, articulated connection between adjacent pans and hence adjacent electrical conductors is necessary.

The object of the present invention is to provide a joint for electrical conductors, which joint is capable, while carrying current, of simultaneous vertical and horizontal articulation as well as extension or retraction in the longitudinal direction, the joint being particularly suitable when the conductors are located in conduits of conveyor pans e.g. for use with the inventions of Ser. No. 574,948.

According to the present invention, an articulated electrical joint comprising in combination:

a pair of electrical conductors for supplying electrical energy to mine equipment, each of said conductors having a square C cross section defined by a rear wall, a pair of upstanding ends formed, respectively, on opposite edges of said rear wall, and a pair of inturned lips formed, respecitvely, on said upstanding ends;

a unitary jointing member having an I cross-section defined by first and second parallel cheeks interconnected by a central stem portion;

said jointing member being mutually engaged with said conductors with said first cheek being located within said conductors, with said first cheek having a dimension, in its direction of parallelism, such that there is established an articulation space beyond opposite ends of said first cheek, and with said stem portion extending outwardly between the inturned lips of said conductors; and at least one resilient, electrically conductive member interposed between said jointing member and the rear walls of said conductors;

the length of the stem portion of said jointing member being greater than the thickness of the lips to establish a further articulation space between the inturned lips of said conductors and the second cheek of said jointing member;

whereby said joint is capable, while carrying current, of simultaneous vertical and horizontal articulation as well as extension or retraction in the longitudinal direction.

Obviously the relative dimensions of the jointing member and the conductor ends are selected to give the required degree of vertical and/or horizontal articulation, up to the limit imposed by those dimensions, the resilient electrical conductive member(s) accommodating this displacement whilst maintaining contact between the ends of the electrical conductors and the jointing member.

The jointing member may be adapted to fit into the conductor ends. The jointing member may have an "I" section so as to define two opposite slots. Thus one end of the "I" section jointing member may be secured from lateral disengagement from the conductor ends by inturned lips of the latter engaging the slots, while the at least one resilient member may be located between an end surface of the inserted end of the jointing member and a rear wall of each conductor end, remote from the inturned lips thereof.

The at least one resilient member may be of copper beryllium, but any resilient copper alloy may be used. The at least one resilient member may be in flat strip form with a plurality of lamellae pressed from the plane of the strip but connected to opposite edges thereof at their ends.

As the jointing member is elongate, the position of the conductor ends with respect to one another may be readily altered upon articulation of the joint in use e.g. about their common longitudinal axis or angularly, with current flow maintained via the common jointing member and the resilient member(s).

The invention will now be described in greater detail, by way of example, with reference to the accompanying drawings in which:

FIG. 1 is a schematic side elevation of a pair of electrical power supply conduits joined together end to end;

FIG. 1A is an enlarged view showing details of the articulated joint of FIG. 1;

FIG. 2 is a sectional view, to an enlarged scale, of the line II to II of FIG. 1;

FIG. 3 is a sectional view, to an enlarged scale through one of the joints of FIG. 1;

FIG. 4 shows one of the joints of FIG. 1 to an enlarged scale and

FIG. 5 is a plan view of FIG. 4.

In the drawings, are shown a pair of electrical power supply conduits 1 e.g. of 5 ft. length intended to be secured end to end to similar conduits to convey electrical energy over the total length required e.g. 200 yards. Conveniently, the conduits 1 are of the general form described in Ser. No. 574,948, but incorporating five conductors 2–6 secured on spaced insulation pillars 7 to body portion 8 of the conduit.

Adjacent conduit ends 9 are secured together at an articulated joint 10, and as shown in FIG. 1, the left hand conduit 1 is able to articulate, in a vertical plane, to the position 1A shown in chain dotted line, while as shown in FIG. 2 the left hand conduit 1 is able to articulate, in the horizontal plane, to the position 1B shown in chain dotted line.

As best seen in FIG. 3, each conductor or bus bar 2–6 has a square C cross section defined by a rear wall 11, a pair of upstanding ends 12 formed respectively on opposite edges of the rear wall 11, and a pair of inturned lips 13, formed respectively on the upstanding ends 12. A gap 14 between adjacent ends 15 of axially aligned conductors 2–6 of adjacent conduits 1 is bridged by a jointing member 16 having an "I" cross section and comprising an electrically conductive portion 17 embedded in a synthetic plastics insulating portion 18 terminating at each end in arc shield 19, the jointing member 16 having first and second parallel cheeks 20 and 21 interconnected by a central stem portion 22. When the jointing member 16 is engaged with a conductor end, the cheek 20 is located within the C of the conductors 2-6, the cheek 20 having a dimension D such that there is established an articulation space 23 beyond opposite ends 24 of the first cheek 20. The stem portion 22 extends outwardly from the conductors 2-6 between the inturned lips 13 and has a length L greater than the thickness T of the lips 13 to establish a further articulation space 25. An electrically conductive member 26 of copper beryllium, made resilient by having a plurality of lamellae pressed therefrom, is interposed between the cheek 20 and the rear wall 11 of the conductor 2-6. As shown in FIGS. 4 and 5, one member 26 is provided for each end of each conductor 2-6, the left hand member 26 of FIG. 5 being secured to the conductor by a pin 27, and the right hand member 26 being a loose fit but having an inturned lip 28, while a stop clip 29 of electrical conductive, resilient material, has a circular head 30 engaging arcuate recesses 31 in the conductor 2-6, the clip 29 serving to ensure that the jointing member 16 is always located over the joint 10, the end of the jointing member 16 remote from the clip 29 abutting the pin 27.

In use, with the conduits 1 secured to side walls of armoured, scraper chain conveyors, which are usually made up of 5 ft. long pans articulated together end to end, the pans during mining operations for instance, are "snaked" forward to a newly exposed mineral face in accordance with the rate of advance of that face by removal of mineral in a mineral winning device and so the articulated joint 10 would be located in the vicinity of the articulated conveyor joints. Thus, articulation to position 1A is accommodated by the provision of articulation spaces 23, up to the limits imposed by the dimension of these spaces, while articulation to position 1B is accommodated by the provision of the further articulated space 25 in combination with the resiliency of the members 26, up to the limits imposed by the dimensions of the further space 25 and the resiliency of the members 26.

What we claim is:

1. An articulated electrical joint, comprising in combination; a pair of electrical conductors for supplying electrical energy to mine equipment, each, of said conductors having a square C cross section defined by a rear wall, a pair of upstanding ends formed, respectively on opposite edges of said rear wall, and a pair of inturned lips formed, respectively, on said upstanding ends; a unitary jointing member having an I cross-section defined by first and second parallel cheeks interconnected by a central stem portion; said jointing member being mutually engaged with said conductors with said first cheek being located within said conductors, with said first cheek having a dimension, in its direction of parallelism, such that there is established an articulation space beyond opposite ends of said first cheek, and with said stem portion extending outwardly between the inturned lips of said conductors; and at least one resilient, electrically conductive member interposed between said jointing member and the rear walls of said conductors; the length of the stem portion of said jointing member being greater than the thickness of the lips to establish a further articulation space between the inturned lips of said conductors and the second cheek of said jointing member; whereby said joint is capable, while carrying current, of simultaneous vertical and horizontal articulation as well as extension or retraction in the longitudinal direction.

2. An electrical joint as claimed in claim 1, wherein said jointing member is adapted to fit into said conductor ends.

3. An electrical joint as claimed in claim 1, wherein said jointing member has an "I"-section so as to define two opposed slots.

4. An electrical joint as claimed in claim 3, wherein one end of said "I"-section jointing member is secured from lateral disengagement from said conductor ends by inturned lips of the latter engaging said slots.

5. An electrical joint as claimed in claim 4, wherein said at least one resilient member is located between an end surface of an inserted end of said jointing member and a rear wall of each conductor end, remote from said inturned lips thereof.

6. An electrical joint as claimed in claim 2, wherein said at least one resilient member is of copper alloy.

7. An electrical joint as claimed in claim 1, wherein said at least one resilient member is of copper beryllium.

8. An electrical joint as claimed in claim 1, wherein said at least one resilient member is in flat strip form with a plurality of lamellae pressed from the plane of the strip but connected to opposite edges thereof at their ends.

* * * * *